United States Patent
Grundke

(10) Patent No.: US 6,662,910 B2
(45) Date of Patent: Dec. 16, 2003

(54) FOOT ACTUATED BRAKE

(75) Inventor: Edgar Grundke, Ditzingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/849,232

(22) Filed: May 7, 2001

(65) Prior Publication Data

US 2002/0007991 A1 Jan. 24, 2002

(30) Foreign Application Priority Data

May 5, 2000 (DE) .......................... 100 21 982

(51) Int. Cl.[7] ................................. F16C 1/26
(52) U.S. Cl. ................. 188/204 R; 74/502.4; 74/502.6
(58) Field of Search .................. 188/24.15, 24.16, 188/24.22, 2 D, 204 R, 10, 196 M; 74/471 R, 502, 502.4, 502.6, 500.6; 292/DIG. 25, 141, 171, 225; 443/13

(56) References Cited

U.S. PATENT DOCUMENTS

| | | | |
|---|---|---|---|
| 2,071,606 A | * | 2/1937 | Axtmann ..................... 188/10 |
| 2,113,435 A | | 4/1938 | Sparrowhawk |
| 2,155,042 A | * | 4/1939 | Gerndt .................... 188/204 R |
| 2,845,812 A | * | 8/1958 | Pobar ......................... 74/502.4 |
| 2,912,072 A | * | 11/1959 | Jones ..................... 188/204 R |
| 2,941,630 A | * | 6/1960 | Anderson ............... 188/204 R |
| 4,480,720 A | * | 11/1984 | Shimano .................... 188/2 D |
| 5,660,081 A | * | 8/1997 | Sato ..................... 292/DIG. 25 |
| 6,305,238 B1 | * | 10/2001 | Gabas .......................... 403/13 |

FOREIGN PATENT DOCUMENTS

| | | |
|---|---|---|
| DE | 3408058 | 9/1985 |
| FR | 652282 | 4/1928 |

* cited by examiner

*Primary Examiner*—Matthew C. Graham
*Assistant Examiner*—Xuan Lan Nguyen
(74) *Attorney, Agent, or Firm*—Crowell & Moring LLP

(57) ABSTRACT

For the connection of the Bowden cable coming from the pedal with the Bowden cables leading to the wheel brakes, the foot parking brake for vehicles has a connection element by means of which the cables are connected with one another. As a compact constructional unit, the connection element is provided with a sleeve part in which a pivot pin can be inserted by means of which swivel levers are connected for the connection of the cable and Bowden controls, and can be fixed as a constructional unit on a vehicle body part, for example, a transmission tunnel.

6 Claims, 4 Drawing Sheets

FOOT ACTUATED BRAKE

BACKGROUND AND SUMMARY OF THE INVENTION

This application claims the priority of German patent document 100 21 982.9, filed May 5, 2000, the disclosure of which is expressly incorporated by reference herein.

The invention relates to a foot parking brake for a vehicle having braking devices arranged at rear wheels, said braking devices each being controllable by a pedal by way of Bowden controls, and a connection element being arranged between the pedal and the braking devices and being connected with the Bowden controls.

From German Patent Document DE 34 08 058 A1, a control system for a parking brake in motor vehicles is known which comprises swivel levers which act upon a brake control element and which are connected with tension cables leading to the wheel brakes.

An object of the invention is to provide a foot parking brake for a motor vehicle having a connection element for the cables between a foot pedal of the parking brake and the two brakes of the wheels which can be mounted in the vehicle in a simple manner and ensures a geared control of the foot pedal force onto the brakes.

According to the invention, this object is achieved by a connection element comprises a swivel lever bearing which, in a sleeve part, has a bearing pin for swivel levers which are arranged on both ends, a first swivel lever is connected with a Bowden cable and cable control of the pedal, and at least another Bowden cable and cable control are connected by way of a connection piece (18) with a connecting rod 17 of the braking devices.

The principal advantages achieved by the invention are that, as a result of the connection element, a compact component is provided between the pedal and the two rear wheel brakes, which compact component connects the cable coming from the pedal in a force-transmitting manner with the cable leading toward the rear to the wheel brakes. The connection element is connected with a swivel lever bearing which, in a sleeve part, has a pivot pin for swivel levers arranged on both sides. One of these swivel levers is connected with the cable of the foot parking brake and the other cable is connected with a connecting rod for the braking devices of the wheels.

So that an optimal force transmission can take place from one swivel lever to the other and thus to the cables, the connection element includes a U-shaped support part with legs which, in the installed position, extend downward from the web. The sleeve part extends transversely to the legs and is fastened partially in an exposed manner above the web in a, for example, semicircular shaped-in section by a weld. The connection of the sleeve part with the connection element can also take place in a different manner.

So that a simple mounting of the connection element in the vehicle body is ensured, it has a bent-out section on its one leg which bent-out section is connected with a receiving plate fastened on the transmission tunnel of the vehicle. The other leg of the connection element is fixed on a side of the transmission tunnel or of the vehicle body, so that a simple mounting and demounting possibility is provided by these fastenings.

The swivel levers of the connection element are held on a pivot pin disposed in the sleeve part. So that a different angular position of the two differently long swivel levers with respect to one another can be adjusted for the purpose of an optimal transmission ratio, one swivel lever can be correspondingly fitted onto a polygonal shaped-out section or on a hexagon on the free pin end, for the purpose of which the swivel lever has a corresponding polygonal receiving bore.

For using the connection element for a right-hand-steered vehicle as well as for a left-hand-steered vehicle, it is provided with two bends on its leg which are arranged at an angle with respect to one another, so that the cable coming from the brake pedal can be suspended in one bend in the case of a left-hand-steered vehicle, and the cable coming from the brake pedal can be suspended in the other bend in the case of a right-hand-steered vehicle. For the use in these two vehicles, the connection element is simply rotated by 180°.

So that an introduction of the Bowden cables from the wheel brakes to the connection element can take place without kinking, the Bowden cables are fed by way of a guiding part to the connection element and to the receiving plate. For this purpose, the guiding plate is provided on the rearward end of the receiving plate and is held by way of lateral cams in recesses of the receiving plate, and a fastening on the transmission tunnel takes place by at least one hook on the guiding part.

An embodiment of the invention is illustrated in the drawings and will be described in detail in the following.

Other objects, advantages and novel features of the present invention will become apparent from the following detailed description of the invention when considered in conjunction with the accompanying drawings.

DETAILED DESCRIPTION OF THE DRAWINGS

Figure 1:
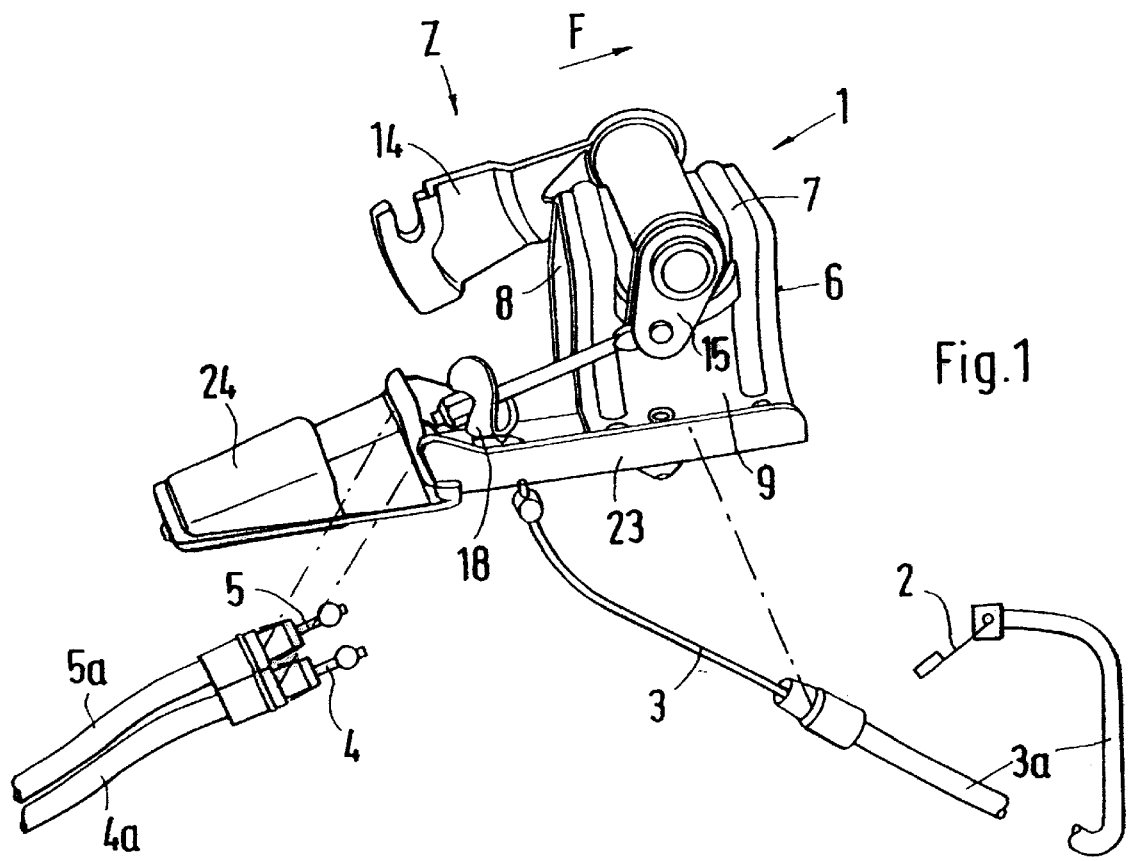
FIG. 1 shows a diagrammatic representation of the connection element with Bowden controls and cables to the brake and to the brake pedal.
Figure 2:
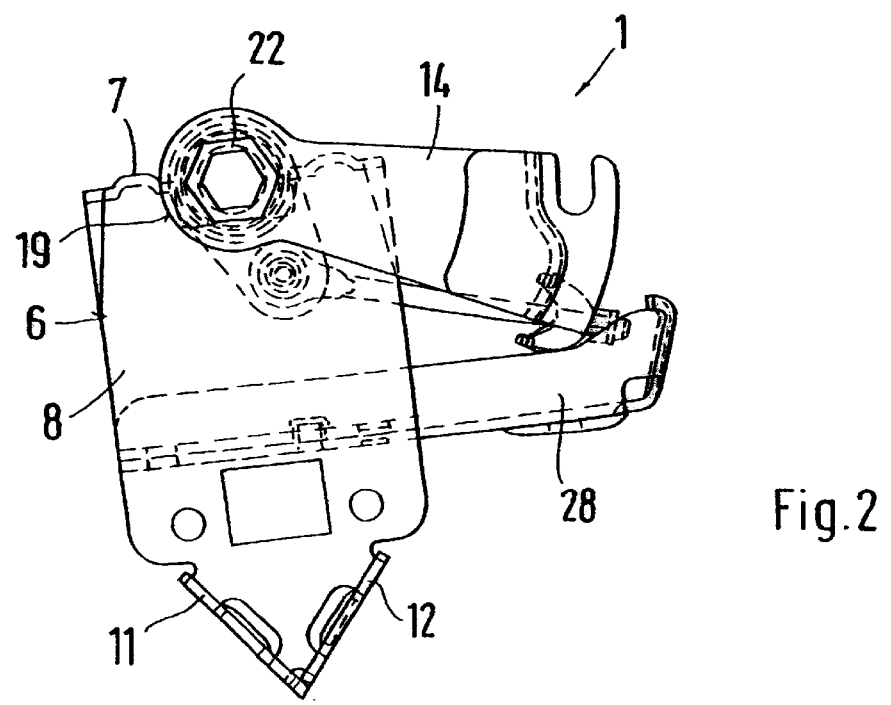
FIG. 2 shows a lateral view of the connection element viewed in the direction Z of FIG. 1.

A connection element 1 for a foot parking brake is illustrated in detail, for example, in FIG. 1, in which case the brake pedal 2 with the cable 3 and the cables 4, 5 leading to the rear wheel brakes are illustrated schematically.

The connection element preferably includes a U-shaped support part 6 which includes a web 7 as well as two bent legs 8, 9 and a bent-out section 10 for fastening on a transmission tunnel or on a body part of the vehicle. Furthermore, the support part 6 has two bends 11, 12, which are arranged at an angle to one another, for the optional supporting of a Bowden control 3a for the cable 3.

A sleeve 16 for the bearing of a pin 13 for two swivel levers 14, 15 is connected with the web 7 of the support part 6. The cable 3 coming from the pedal 2 is connected with one swivel lever 14, and a connecting rod 17 is connected with the other swivel lever 15. The cables 4, 5 leading to the two brakes on the rear wheel are connected to the connecting rod 17 by way of a connection piece 18 in a suspended manner.

The sleeve 16 is held in a shaped-in section 19—which can be constructed, for example, in a semicircular shape—of the web 7 of the connection element 1 and is fixed by a weld. For the mounting, the bearing pin 13 is fixedly connected with one swivel lever 15 and is fitted through the sleeve 16 and, at the guided-through free end 20, is fixedly connected with the other swivel lever 14.

To ensure the swivel lever 14 is secured against torsion on the bearing pin 13, the free end 20 has a polygonal shaped-on section 22, such as a hexagon, on which the swivel lever 14 is held by a correspondingly constructed hexagonal bore 21. As a result of the position of the swivel lever 14 with respect to the swivel lever 15, a corresponding adjustment for the controlling of the brakes can be carried out. After the swivel lever 14 is placed on the bearing pins 13, a fixing can be carried out, for example, by a weld.

By way of the bent-out section 10, the connection element 1 is connected with a receiving plate 23 which is fixed on the transmission tunnel and is used as a reinforcement. Another fastening of the connection element 1 takes place by way of the leg 8 on the transmission tunnel or on the vehicle body, which is not shown in detail.

Figure 3:
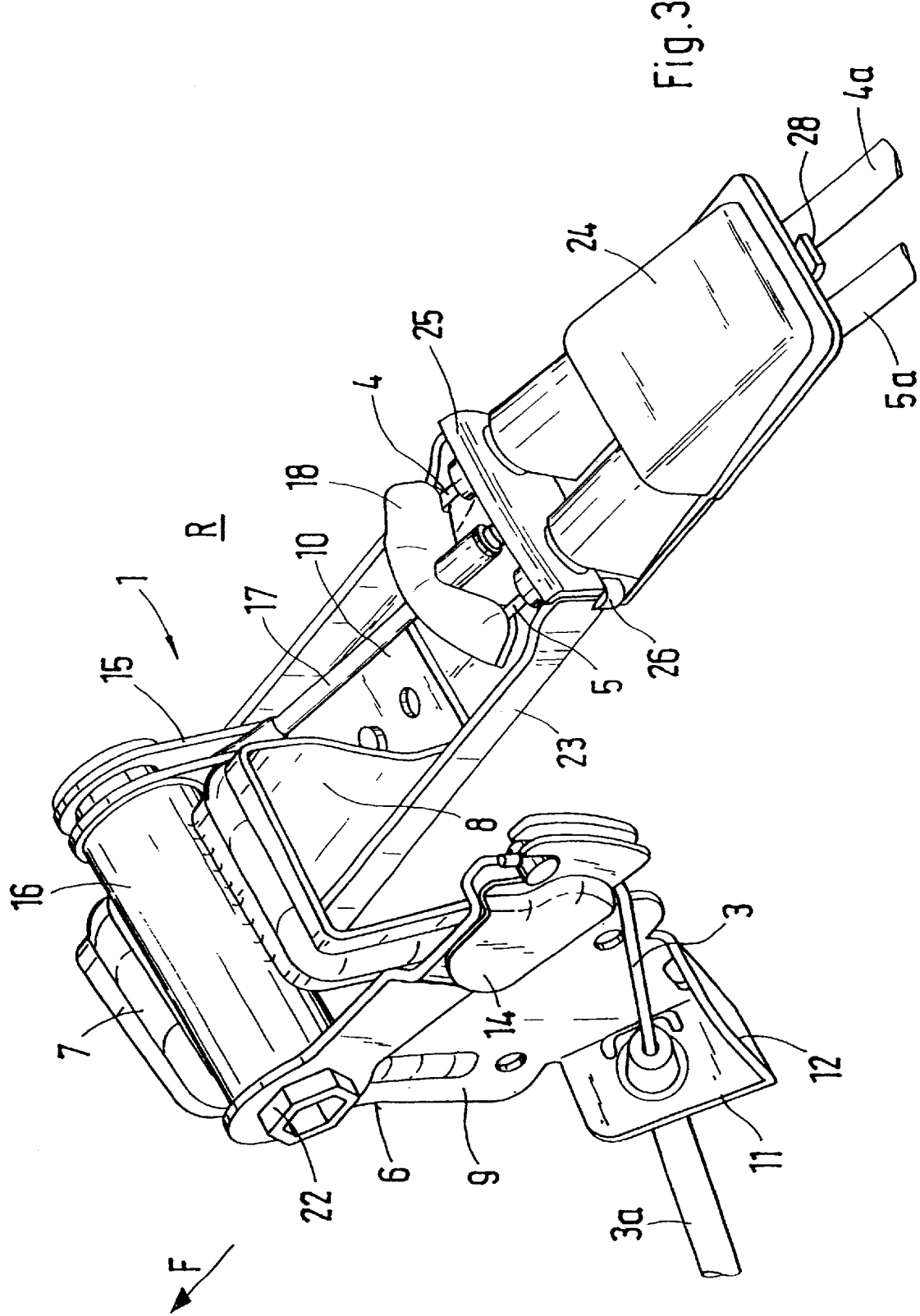
FIG. 3 shows a diagrammatic representation of the connection element viewed from the rear in the driving direction F of the vehicle.
Figure 4:
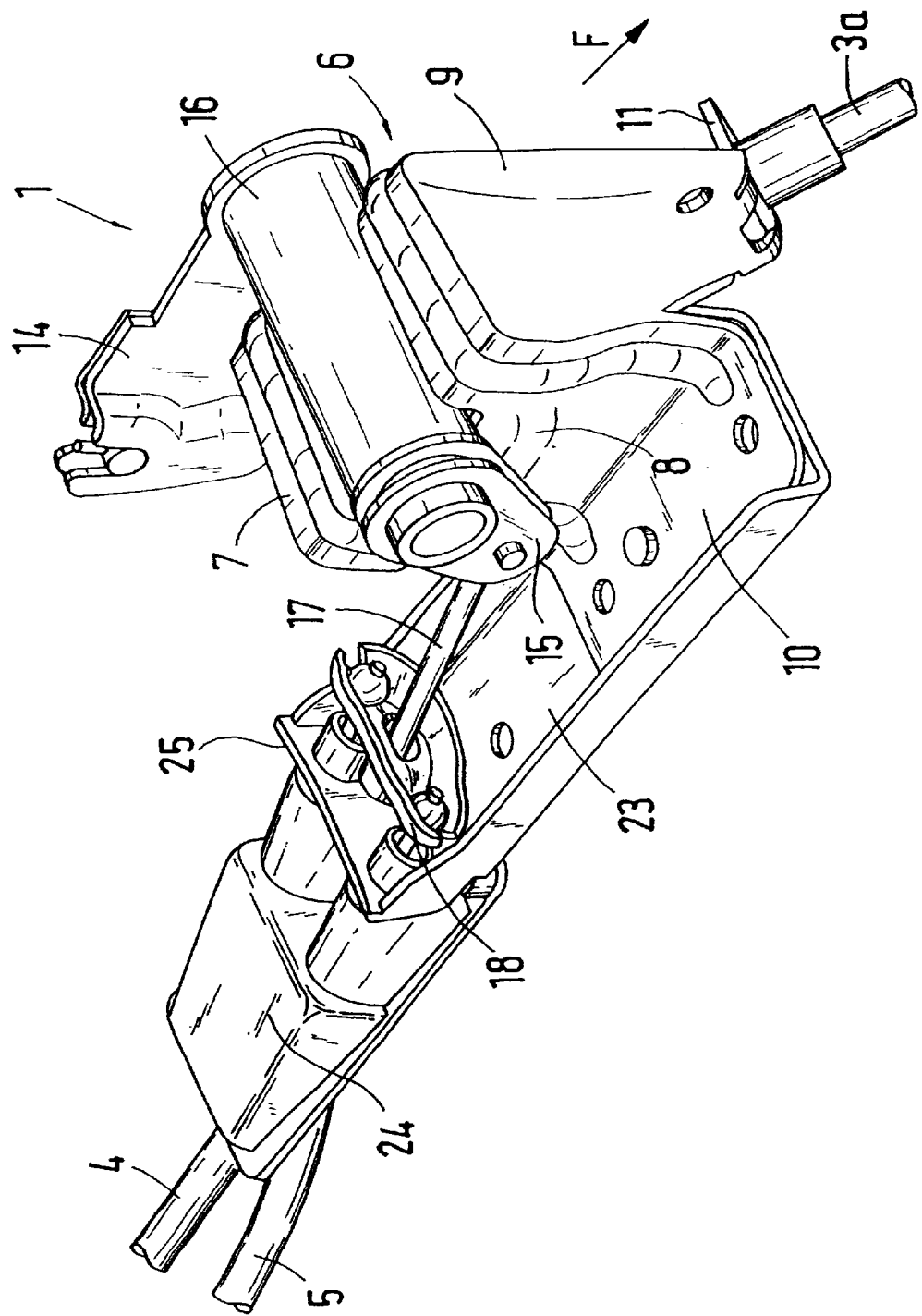
FIG. 4 shows a diagrammatic representation of the connection element viewed from the front against the driving direction F of the vehicle.

The drawings show the connection element 1 for a left-hand-steered vehicle. In the case of a right-hand-steered vehicle, the connection element 1 according to FIG. 3 is rotated 180°, so that the swivel lever 14 is in the vehicle side R. The supporting of the Bowden control 3a takes place, instead of in the bend 11 of the connection element 1, in the other bend 12. The bearing is built in a minor-image manner, and the lever 14 is fastened on the section 22 in a position adapted to the right-hand-steered vehicle.

Figure 5:
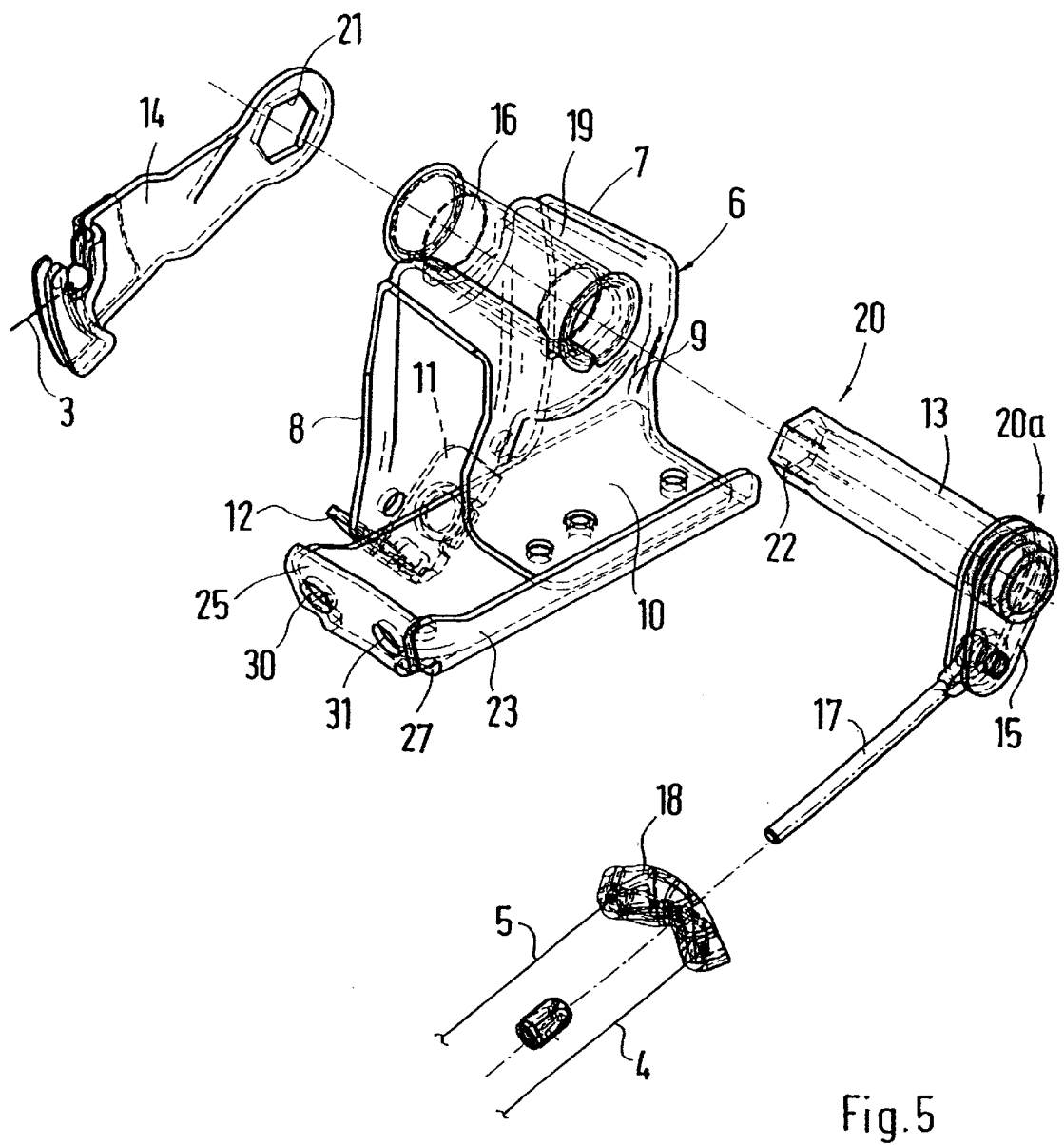
FIG. 5 shows a diagrammatic representation of the connection element with a demounted pivot pin and a swivel lever.

A guiding part 24 is connected with the receiving plate 23. In the guiding part 24, the Bowden controls 4a, 5a of the cables 4, 5 are guided in a straight manner to the inlet into the receiving plate 23 and are supported in a transverse web 25 in bores 30, 31 of the plate 23. The guiding part 24 is held in a position-secured manner by way of corner-side cams 26 (FIG. 3) which engage in corresponding recesses 27 (FIG. 5). A hooking into the transmission tunnel takes place by way of an end-side hook element 28.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Foot parking brake for a vehicle having braking devices arranged at rear wheels, said braking devices each being controllable by a pedal by way of Bowden controls, and a connection element being arranged between the pedal and the braking devices and being connected with the Bowden controls, wherein the connection element comprises a swivel lever bearing which, in a sleeve part, has a bearing pin for swivel levers which are arranged on both ends of the pin, a first swivel lever being connected with a Bowden cable and cable control of the pedal, and at least another Bowden cable and cable control being connected by way of a connection piece with a connecting rod of the braking devices, wherein the connection element comprises a U-shaped support part with legs which, in an installed position, extend downward from a web, the sleeve part extending transversely to the legs and being fastened in a partially exposed manner above the web in a shaped-in section.

2. Foot parking brake for a vehicle having braking devices arranged at rear wheels, said braking devices each being controllable by a pedal by way of Bowden controls, and a connection element being arranged between the pedal and the braking devices and being connected with the Bowden controls, wherein the connection element comprises a swivel lever bearing which, in a sleeve part, has a bearing pin for swivel levers which are arranged on both ends of the pin, a first swivel lever being connected with a Bowden cable and cable control of the pedal, and at least another Bowden cable and cable control being connected by way of a connection piece with a connecting rod of the braking devices, wherein the connection element has on a first leg a bent-out section adapted to be fastened with a receiving plate on a transmission tunnel of the vehicle and a second leg adapted to be fastened directly on the transmission tunnel, said second leg having first and second bends for fixing the Bowden cable and cable control of the pedal, said cable being suspended in the first swivel lever arranged at a distance from the bends.

3. Foot parking brake according to claim 2, wherein, on a free end, the receiving plate has receiving bores in a transverse web for the at least another cable control of the at least another Bowden cable leading to the two brakes, said cables being held in the connection piece which is fastened on the connecting rod.

4. Foot parking brake according to claim 2, wherein the receiving plate is provided with a guiding part for the at least another cable controls, said guiding part being inserted at a rearward end of the receiving plate by way of lateral cams in recesses of the receiving plate and, for operatively fixing on the transmission tunnel, equipped with at least one hook which is adapted to be hooked into a corresponding recess in the transmission tunnel.

5. Foot parking brake according to claim 3, wherein the receiving plate is provided with a guiding part for the at least another cable controls, said guiding part being inserted at a rearward end of the receiving plate by way of lateral cams in recesses of the receiving plate and, for operatively fixing on the transmission tunnel, equipped with at least one hook which is adapted to be hooked into a corresponding recess in the transmission tunnel.

6. Foot parking brake according to claim 2, wherein the connection element can be used for a right-hand-steered and a left-hand-steered vehicle such that the connection element for the right-hand-steered vehicle, rotated by 180°, is connected by way of the bent-out section with the receiving plate, and the cable control of the pedal is supported in the second bend which is set at an angle with respect to the first bend for the left-hand-steered vehicle.

* * * * *